Nov. 14, 1933.  J. DURHAM  1,934,845
FISH BOBBER
Filed March 15, 1933
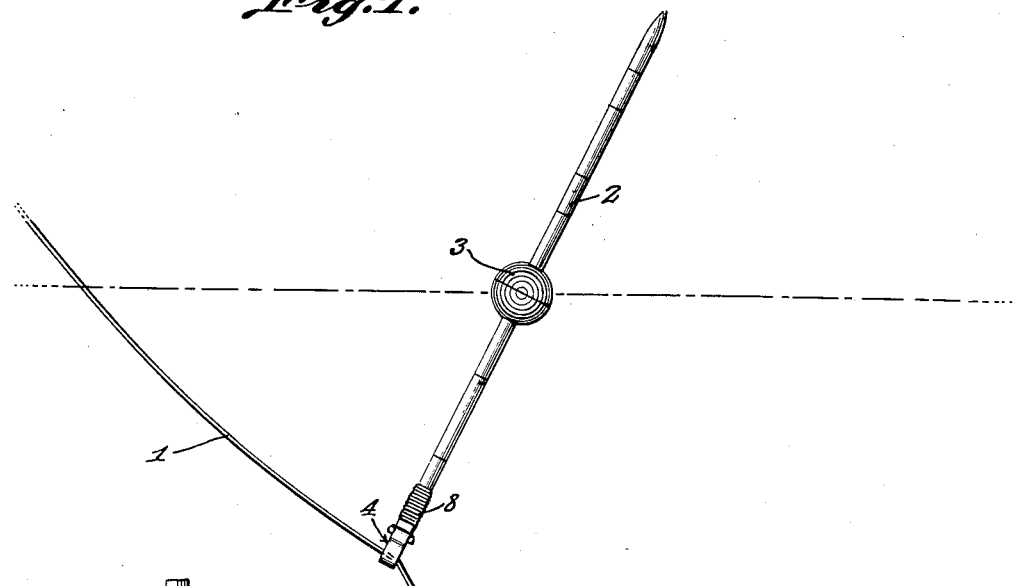
James Durham, INVENTOR
BY Victor J. Evans & Co.
ATTORNEY Patented Nov. 14, 1933

1,934,845

UNITED STATES PATENT OFFICE 1,934,845

FISH BOBBER

James Durham, Warsaw, Ind.

Application March 15, 1933. Serial No. 660,926

2 Claims. (Cl. 43—49)

This invention relates to fish bobbers and has for the primary object, the provision of a device of the above stated character which may be easily and quickly applied and removed from a fishing line without disturbing any of the fishing tackle carried by the fishing line and may be adjusted to any place on the line and when applied or in use will remain attached to the line against accidental displacement and will in no way injure or place undue wear on the line.

For a complete understanding of my invention, reference is to be had to the following description and accompanying drawing, in which Figure 1 is a side elevation of a fish bobber illustrating my invention and showing the same applied to a line.

Figure 2 is a side elevation illustrating the means of attaching the line to the bobber.

Figure 3 is a view similar to Figure 2 and taken at right angles thereto.

Figure 4 is a sectional view taken on the line 4—4 of Figure 3.

Figure 5 is a sectional view taken on the line 5—5 of Figure 3.

Figure 6 is a plan view illustrating a blank from which the line securing means is constructed.

Figure 7 is a sectional view taken on the line 7—7 of Figure 3.

Figure 8 is a fragmentary enlarged sectional view illustrating a modified form of my invention.

Referring in detail to the drawing, the numeral 1 indicates a fishing line extending into a body of water with a bobber applied thereto constructed in accordance with the present invention. The bobber consists of a shaft or stem 2 having secured thereto a float 3 of any suitable shape for the purpose of maintaining the stem in a substantially perpendicular position on the water with one end of the stem protruding out of the water to act as a signal or indicator.

A clamp 4 is secured to the lower end of the stem 2 and is adapted to receive and grip the fishing line, as shown in Figure 1. The clamp 4 permits the application of the device to the line without removing or disturbing fishing tackle carried by the line and permits the device to be adjusted along the line to suit different fishing conditions and depths of water.

The clamp 4 is constructed from a blank 5 which has one end enlarged and bifurcated, as shown at 6. The opposite end of the blank 5 forms an attaching end 7 received within a bifurcation of the stem 2. The slit end of the stem after the insertion of the shank 7 is wrapped with a flexible element 8, as shown in Figures 2 and 3, or a suitable ferrule 9 may be placed over the slit end, as shown in Figure 8. The blank 5 is bent upon itself at the lines indicated in Figure 6 to form parallel gripping portions 10 with one gripping portion terminating in a hook-shaped element 11 having at its free end the bifurcation 6 so as to receive the shank adjacent the latter's attachment to the stem 2. The arrangement of the hook-shaped element 11 will permit the insertion of the line 1 between the gripping portions 10 by pulling the line between the shank and the free notched end of the hook-shaped element. The line when confined between the gripping portions is prevented from slipping relative to the clamp and due to the width of the blank the clamping portions 10 have comparatively large bearing surfaces for the line to engage and thereby materially reduce wear on the line or chances of subjecting the line to injury. When it is desired to remove or detach the device from the line, the hook element 11 is flexed away from the shank 7, permitting the line to be easily withdrawn from between the gripping portions 10 and outwardly of the hook-shaped element.

Having described the invention, I claim:

1. A bobber comprising a stem, a float on the stem, a shank secured to the stem and having its free end bifurcated, said shank being bent upon itself to form substantially parallel gripping portions with one of said portions terminating into a hook-shaped element with the bifurcation receiving the shank to permit the insertion and removal of a fishing line between the gripping portions.

2. A bobber comprising a stem, a float on the stem, a shank secured to the stem and bent upon itself to form substantially parallel gripping portions, and closure means between said gripping portions to permit the insertion and removal of a fishing line between the gripping portions.

JAMES DURHAM.